(12) United States Patent
Lee et al.

(10) Patent No.: US 10,210,967 B2
(45) Date of Patent: Feb. 19, 2019

(54) POWER CABLE

(71) Applicant: LS CABLE & SYSTEM LTD., Anyang-si, Gyeonggi-do (KR)

(72) Inventors: Jae Ik Lee, Seoul (KR); Won Sang Yoo, Seoul (KR); Kwang Mo Kim, Busan (KR); Sung Tae Kang, Busan (KR); Tae Hyun Lee, Bucheon-si (KR)

(73) Assignee: LS CABLE & SYSTEM LTD., Anyang-si, Gyeonggi-Do (KR)

( * ) Notice: Subject to any disclaimer, the term of this patent is extended or adjusted under 35 U.S.C. 154(b) by 0 days.

(21) Appl. No.: 15/568,349

(22) PCT Filed: May 3, 2016

(86) PCT No.: PCT/KR2016/004669
§ 371 (c)(1),
(2) Date: Oct. 20, 2017

(87) PCT Pub. No.: WO2016/182254
PCT Pub. Date: Nov. 17, 2016

(65) Prior Publication Data
US 2018/0158570 A1 Jun. 7, 2018

(30) Foreign Application Priority Data

May 11, 2015 (KR) .................. 10-2015-0065523
Jul. 3, 2015 (KR) .................. 10-2015-0095281
May 2, 2016 (KR) .................. 10-2016-0053920

(51) Int. Cl.
*H01B 7/28* (2006.01)
*C09J 123/08* (2006.01)
(Continued)

(52) U.S. Cl.
CPC .............. *H01B 7/2806* (2013.01); *C09J 5/06* (2013.01); *C09J 7/243* (2018.01); *C09J 7/35* (2018.01);
(Continued)

(58) Field of Classification Search
USPC ...................................... 174/71 C
See application file for complete search history.

(56) References Cited

U.S. PATENT DOCUMENTS 3,790,697 A * 2/1974 Buckingham ............ H01B 9/02
174/102 R
3,812,283 A * 5/1974 Kothe .................... H01B 11/06
174/105 R
(Continued)

FOREIGN PATENT DOCUMENTS

JP 04-012408 A 1/1992
JP H10-114015 A 5/1998
(Continued)

OTHER PUBLICATIONS

International Search Report for PCT/KR2016/004669 dated Aug. 30, 2016 from Korean Intellectual Property Office.
(Continued)

*Primary Examiner* — William H Mayo, III
*Assistant Examiner* — Krystal Robinson
(74) *Attorney, Agent, or Firm* — K&L Gates LLP (57) ABSTRACT

The present invention relates to a power cable. More particularly, the present invention relates to a power cable which is, when compared to the existing power cables, lightweight and includes a watertight layer which improves a corrosion resistance and is effectively suppressed from being peeled since the interlayer adhesiveness thereof is maintained regardless of an externally physical impact and a temperature change.

24 Claims, 3 Drawing Sheets

(51) Int. Cl.
| | |
|---|---|
| C09J 133/02 | (2006.01) |
| C09J 7/35 | (2018.01) |
| C09J 5/06 | (2006.01) |
| C09J 7/24 | (2018.01) |
| H01B 7/18 | (2006.01) |
| H01B 7/22 | (2006.01) |
| H01B 9/02 | (2006.01) |
| H01B 19/04 | (2006.01) |
| C09J 123/06 | (2006.01) |

(52) U.S. Cl.
CPC ....... *C09J 123/06* (2013.01); *C09J 123/0869* (2013.01); *C09J 133/02* (2013.01); *H01B 7/187* (2013.01); *H01B 7/226* (2013.01); *H01B 7/28* (2013.01); *H01B 9/027* (2013.01); *H01B 19/04* (2013.01); *C09J 2203/302* (2013.01); *C09J 2400/16* (2013.01); *C09J 2423/04* (2013.01); *C09J 2423/041* (2013.01); *C09J 2433/00* (2013.01)

(56) References Cited

U.S. PATENT DOCUMENTS

| | | | | |
|---|---|---|---|---|
| 3,829,602 | A * | 8/1974 | Ishikawa | H01B 7/22 138/155 |
| 4,461,076 | A * | 7/1984 | Plummer, III | H01B 7/0838 156/54 |
| 4,472,597 | A * | 9/1984 | Uematsu | H01B 7/2825 174/106 SC |
| 4,501,928 | A | 2/1985 | Ishitobi | |
| 4,552,989 | A * | 11/1985 | Sass | H01B 11/20 174/103 |
| 4,626,619 | A * | 12/1986 | Uematsu | H01B 7/2825 174/106 R |
| 4,703,134 | A * | 10/1987 | Uematsu | H01B 7/2825 174/106 SC |
| 5,300,733 | A * | 4/1994 | Uematsu | H01B 7/2806 174/106 SC |
| 5,486,648 | A * | 1/1996 | Chan | H01B 7/288 174/105 SC |
| 6,215,070 | B1 * | 4/2001 | King | H01B 7/2825 174/110 R |
| 7,285,726 | B2 * | 10/2007 | Bremnes | F16L 53/37 174/102 R |
| 2014/0166335 | A1 | 6/2014 | Kagoura et al. | |
| 2016/0155537 | A1 * | 6/2016 | Manabe | H01B 7/045 174/107 |

FOREIGN PATENT DOCUMENTS

| | | |
|---|---|---|
| JP | 2013-045552 A | 3/2013 |
| KR | 10-2013-0060931 A | 6/2013 |

OTHER PUBLICATIONS

Japanese Office Action for related Japanese Application No. 2017-553405; action dated Nov. 27, 2018; (3 pages).

* cited by examiner

POWER CABLE

CROSS REFERENCE TO PRIOR APPLICATIONS

This application is a National Stage Patent Application of PCT International Patent Application No. PCT/KR2016/004669 (filed on May 3, 2016) under 35 U.S.C. § 371, which claims priority to Korean Patent Application Nos. 10-2015-0065523 (filed on May 11, 2015), 10-2015-0095281 (filed on Jul. 3, 2015), and 10-2016-0053920 (filed on May 2, 2016), which are all hereby incorporated by reference in their entirety.

TECHNICAL FIELD

The present invention relates to a power cable. More particularly, the present invention relates to a power cable which is, when compared to the existing power cables, lightweight and includes a watertight layer which improves a corrosion resistance and is effectively suppressed from being peeled since the interlayer adhesiveness thereof is maintained regardless of an externally physical impact and a temperature change.

BACKGROUND ART

Generally, power cables such as a submarine cable and an underground cable include a watertight layer which suppresses permeation of moisture from the outside.

Figure 1:
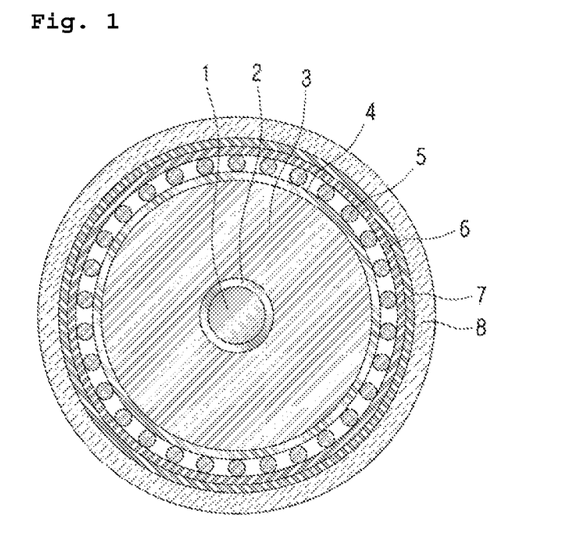
FIG. 1 schematically illustrates a structure of a cross section of an example of a power cable according to the related art.

FIG. 1 schematically illustrates a structure of a cross section of the power cable disclosed in U.S. Pat. No. 4,472,597. As illustrated in FIG. 1, the power cable according to the related art may have a structure in which a conductor 1, an inner semiconducting layer 2, an insulating layer 3, an outer semiconducting layer 4, a metal shield layer 5, a conductive tape layer 8, a watertight layer 7, and an external jacket 6 are sequentially formed.

Here, when an aluminum laminated tape in which both sides of aluminum foil are coated with polyethylene is used as the watertight layer 7, the aluminum foil is likely to corrode and may be thus damaged by moisture penetrating the external jacket 6, thereby reducing the lifespan of the power cable.

Figure 2:
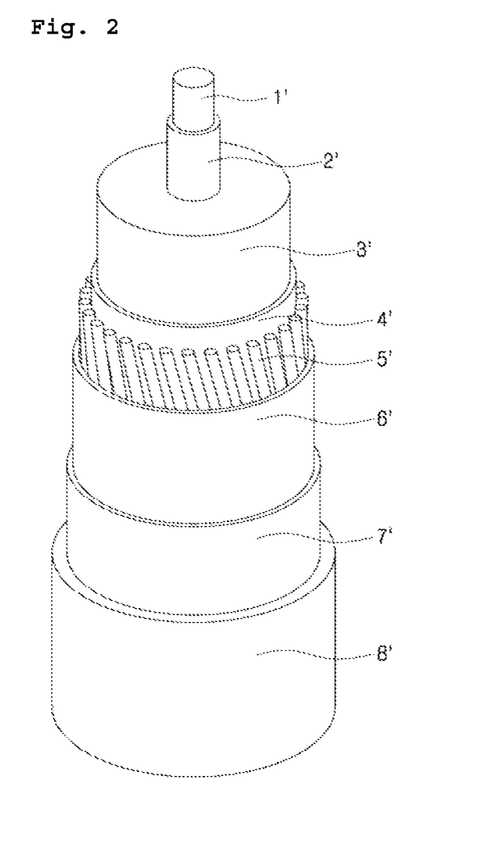
FIG. 2 schematically illustrates a structure of a cross section of another example of a power cable according to the related art.

FIG. 2 schematically illustrates a structure of a cross section of the power cable disclosed in U.S. Pat. No. 4,501,928. As illustrated in FIG. 2, the power cable according to the related art may have a structure in which a conductor 1', an inner semiconducting layer 2', an insulating layer 3', an outer semiconducting layer 4', a metal shield layer 5', a semiconducting tape 6', a watertight layer 7', and an external jacket 8' are sequentially formed.

Here, when a lead laminated tape in which both sides of lead foil are coated with polyethylene, polyvinyl chloride, or the like is used as the watertight layer 7', the lead foil is heavy in weight and may thus prevent the manufacture of a lightweight power cable.

The watertight layers 7 and 7' applied to the power cables according to the related art do not have adhesion strength enough to be adhered to the external jackets 6 and 8' and may be thus separated from the external jackets 6 and 8' due to an externally physical impact or a temperature change.

Accordingly, there is an urgent need for a power cable which is, when compared to existing power cables, lightweight, and includes a watertight layer which improves a corrosion resistance and is effectively suppressed from being peeled since the interlayer adhesiveness thereof is maintained regardless of an externally physical impact and a temperature change.

DETAILED DESCRIPTION OF THE INVENTION

Technical Problem

The present invention is directed to a power cable which is lighter than the existing power cables.

The present invention is also directed to a power cable including a watertight layer which improves a corrosion resistance and is effectively suppressed from being peeled since the interlayer adhesiveness thereof is maintained regardless of an externally physical impact and a temperature change.

Technical Solution

According to an aspect of the present invention, a ~
According to another aspect of the present invention, a~

Advantageous Effects

A power cable according to the present invention includes a watertight layer formed of a lightweight material and is thus lighter in weight than existing power cables.

A power cable according to the present invention includes a watertight layer formed of a material having a high corrosion resistance to be suppressed from being corroded.

A power cable according to the present invention additionally includes an adhesive layer for improving adhesion strength between a watertight layer and an external jacket and effectively suppressing permeation of moisture which is a major factor decreasing the adhesion strength between the watertight layer and the external jacket to effectively suppressing the watertight layer from being peeled regardless of externally physical impact and a temperature change, thereby maintaining the function of the watertight layer and suppressing a decrease in the lifespan of the power cable.

MODE OF THE INVENTION

Hereinafter, exemplary embodiments of the present invention will be described in detail. However, the present invention is limited to the embodiments set forth herein and may be embodied in many different forms. Rather, these embodiments are provided so that this disclosure will be thorough and complete and will fully convey the concept of the present invention to those of ordinary skill in the art. The same reference numerals represent the same elements throughout the drawings.

Figure 3:
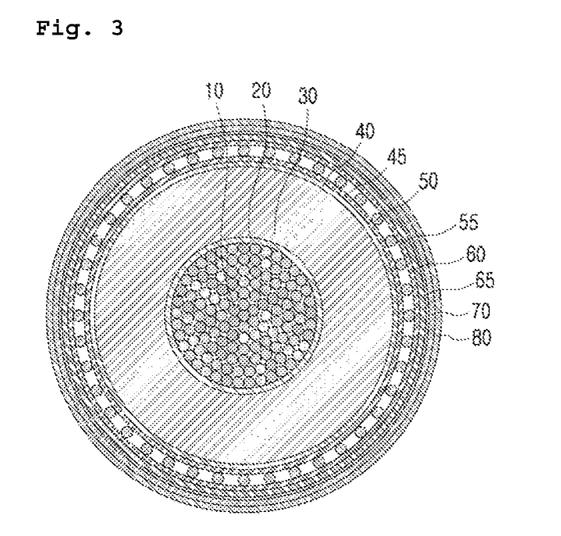
FIG. 3 is a cross-sectional view schematically illustrating a structure of a cross section of a power cable according to an embodiment of the present invention.
Figure 4:
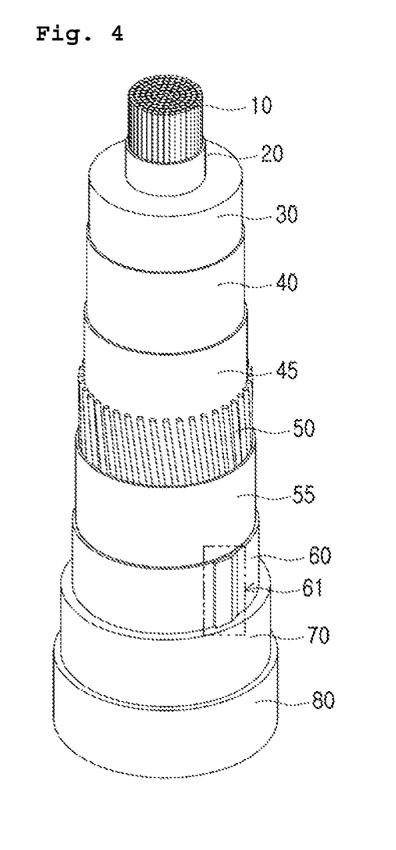
FIG. 4 is a longitudinal sectional view schematically illustrating a structure of a cross section of a power cable according to an embodiment of the present invention.

FIGS. 3 and 4 schematically illustrate a structure of a cross section of a power cable according to an embodiment of the present invention. As illustrated in FIGS. 3 and 4, the power cable according to the present invention may include a center conductor layer 10, an inner semiconducting layer 20 covering the center conductor layer 10, an insulating layer 30 covering the inner semiconducting layer 20, an outer semiconducting layer 40 covering the insulating layer 30, a metal layer 50 located on an outer surface of the outer semiconducting layer 40 and including a plurality of metal wires, a watertight layer 60 surrounding an outer surface of the metal layer 50, an adhesive layer 70 surrounding an outer surface of the watertight layer 60, and a jacket layer 80 surrounding an outer surface of the adhesive layer 70.

The power cable according to the present invention may further include a first semiconducting layer 45 located between the outer semiconducting layer 40 and the metal layer 50, a second semiconducting layer 55 located between the metal layer 50 and the watertight layer 60, an adhesion assisting layer 65 located between the watertight layer 60 and the adhesive layer 70, and the like.

The center conductor layer 10 may include a single wire formed of copper or aluminum, and preferably, copper, or a stranded wire obtained by twisting a plurality of such wires together. A standard for the center conductor layer 10, including the diameter of the center conductor layer 10, the diameter of each element wire of the stranded wire, etc., may vary according to a transmission voltage, purpose, etc. of the power cable including the center conductor layer 10, or may be appropriately selected by a technician of ordinary skill in the art. For example, when the power cable according to the present invention is an underground cable used for a purpose which requires installation performance, flexibility, etc., the center conductor layer 10 is preferably a stranded wire having higher flexibility than that of a single wire.

The inner semiconducting layer 20 is provided between the center conductor layer 10 and the insulating layer 30 to remove an air layer causing the occurrence of interlayer peeling between the center conductor layer 10 and the insulating layer 30 and reduce local concentration of electric field. The outer semiconducting layer 40 performs a function of uniformly applying an electric field to the insulating layer 30, a function of reducing local concentration of electric field, and a function of protecting the insulating layer 30 from the outside.

Generally, the inner semiconducting layer 20 and the outer semiconducting layer 40 may be each formed by extruding a semiconducting composition in which conductive particles, such as carbon black, carbon nanotube, carbon nanoplate, or graphite, are dispersed on base resin. To improve interlayer adhesion strength between the semiconducting layers 20 and 40 and the insulating layer 30, the base resin is preferably olefin resin which is of the same group as a base resin of an insulating composition used to form the insulating layer 30, e.g., copolymer resin of olefin and an acryl-based monomer, and particularly, ethylene butyl acrylate (EBA), ethylene ethyl acrylate (EEA), or the like.

Thicknesses of the inner and outer semiconducting layers 20 and 40 may vary according to a transmission voltage of the power cable. For example, in the case of a 345 kV power cable, the inner semiconducting layer 20 may have a thickness of 1.6 to 1.8 mm and the outer semiconducting layer 40 may have a thickness of 1.02 to 2.54 mm.

As base resin of the insulating layer 30 may be, for example, polyolefin resin such as polyethylene or polypropylene, and may be preferably formed by extruding an insulating composition including polyethylene resin.

The polyethylene resin may be ultra-low-density polyethylene (ULDPE), low-density polyethylene (LDPE), linear low-density polyethylene (LLDPE), medium-density polyethylene (MDPE), high-density polyethylene (HDPE), or a combination thereof. Alternatively, the polyethylene resin may be a homopolymer, a random or block copolymer with α-olefin such as ethylene, propylene, 1-butene, 1-pentene, 1-hexene, or 1-octane, or a combination thereof.

Furthermore, the insulating composition used to form the insulating layer 30 may include a cross-linking agent. Thus, the insulating layer 30 may be formed of cross-linked polyolefin (XLPO), and preferably, cross-linked polyethylene (XLPE), using an additional cross-linking process during or after extruding of the insulating composition thereof. The insulating composition may additionally include other additives such as an anti-oxidant, an extrusion improver, a cross-linking agent, etc.

The cross-linking agent may be a silane-based cross-linking agent or an organic peroxide-based cross-linking agent, such as dicumyl peroxide, benzoyl peroxide, lauryl peroxide, t-butyl cumyl peroxide, di(t-butylperoxy isopropyl)benzene, 2,5-dimethyl-2,5-di(t-butylperoxy)hexane, or di-t-butyl peroxide, according to a method of cross-linking the polyolefin. Here, the content of the cross-linking agent may be 1 to 5 parts by weight with respect to 100 parts by weight of the base resin.

A thickness of the insulating layer 30 may vary according to a transmission voltage of the power cable. For example, in the case of a 345 kV power cable, the insulating layer 30 may have a thickness of 27.45 to 34.55 mm.

The metal layer 50 may be formed using a plurality of neutral wires formed of a metal, and preferably, copper. The first semiconducting layer 45 may be formed below the metal layer 50 by horizontally winding a first semiconducting tape, and the second semiconducting layer 55 may be formed on the metal layer 50 by horizontally winding a second semiconducting tape. The metal layer 50 protects the power cable in a harsh environment, such as under the sea.

The first semiconducting layer 45 absorbs shock to suppress the insulating layer 30 from being deformed due to the weight of the metal layer 50. The second semiconducting layer 55 performs binding of the metal layer 50. The first and second semiconducting layers 45 and 55 may be each a wet swelling tape. In this case, the first and second semiconducting layers 45 and 55 may also perform an impermeable function of blocking moisture. The first and second semiconducting tape may have, for example, a thickness of about 200 to 1,000 μm.

The metal layer 50 may have, for example, a thickness of about 2.2 to 2.4 mm. The first and second semiconducting layers 45 and 55 may each have, for example, a thickness of about 0.85 to 0.95 mm.

The watertight layer 60 may be formed of a metal, preferably, a metal material, e.g., copper, which is of the same group as the metal layer 50, and particularly, a copper tape. The watertight layer 60 suppresses moisture permeating via the jacket layer 80 from permeating the insulating layer 30. Furthermore, when the watertight layer 60 is formed of a metal material, e.g., copper (Cu), which is of the same group as the metal layer 50, galvanic corrosion may be suppressed from occurring between the watertight layer 60 and the metal layer 50. Furthermore, the watertight layer 60 may assist electrical characteristics of the metal layer 50.

Here, the copper tape used to form the watertight layer 60 has a higher corrosion resistance than an existing aluminum foil layer, is more lightweight than an existing lead foil layer, and may have, for example, a thickness of about 0.1 to 0.25 mm.

Figure 5:
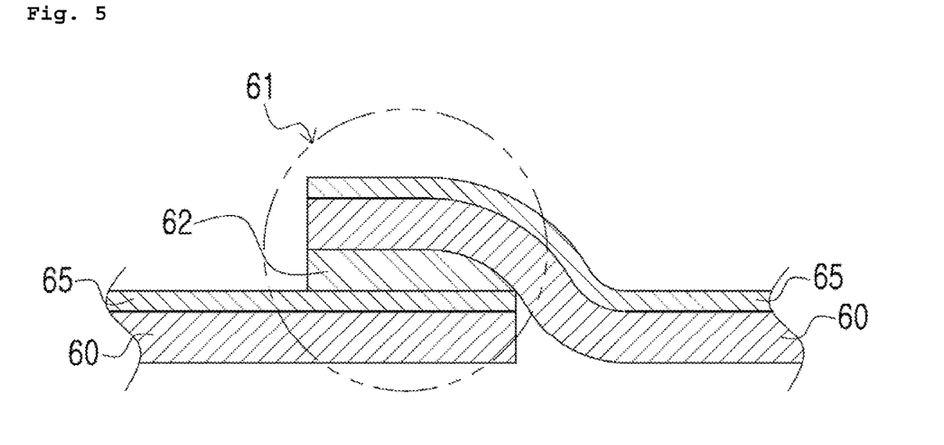
FIG. 5 is a schematic enlarged view of a structure of a cross section of an overlapping part of a watertight layer of FIG. 4.

FIG. 5 is a schematic enlarged view of a structure of a cross section of an overlapping part 61 of the watertight layer 60 of FIG. 4.

As illustrated in FIGS. 4 and 5, in order to enhance watertight characteristics of the watertight layer 60, opposite ends of the watertight layer 60 may be overlapped with each other. Upper and lower surfaces of the opposite ends of the watertight layer which overlap each other in the overlapping region may be closely adhered to each other via a hot-melt adhesive 62. The hot-melt adhesive 62 is an additive melted by heat, which is 100% thermoplastic resin exhibiting adhesive strength when it is cooled and hardened several seconds after applied and compressed in a liquid state onto an object at a high temperature without water or a solvent.

The hot-melt adhesive 62 does not need to undergo a drying process and needs a small work space, and an adhesion speed thereof is high, when compared to other solvent type additives or water dispersed additives. Examples of a material of the hot-melt adhesive 62 may include polyurethane, polyamide, polyester, polyethylenevinyl acetate, rubber, and the like. Generally, the hot-melt adhesive 62 may further include wax, a gluing agent, a plasticizer, a filler, an anti-oxidant, or the like.

The hot-melt adhesive 62 is preferably a polyamide-based material having a creep resistance temperature of 80° C. or higher and a softening temperature so that it may be used for the power cable. For example, Q8740 or Q6239 which has been sold by Henkel may be used as the hot-melt adhesive 62.

As illustrated in FIG. 5, the adhesion assisting layer 6 may be formed on the watertight layer 60. Since the watertight layer 60 and the adhesive layer 70 may be difficult to be adhered to each other, the adhesion assisting layer 65 formed of resin to be easily adhered with the adhesive layer 70 is laminated on the watertight layer 60, e.g., a copper tape. The adhesion assisting layer 65 may have, for example, a thickness of about 0.05 to 0.09 mm.

A method of laminating the adhesion assisting layer 65 is not limited. For example, methods such as deposition, electrodeposition, and extrusion may be used. The adhesion assisting layer 65 may maintain close adhesion between the watertight layer 60 and the jacket layer 80 even under harsh conditions, e.g., when an external impact is applied to the cable or when a temperature sharply changes, and suppress a copper tape or the like used to form the watertight layer 60 from being corroded.

Here, the adhesion assisting layer 65 may include an additive having adhesiveness to make a peel strength survival rate of the jacket layer 80 with respect to the watertight layer 60 be 70% or greater, when measured after the power cable is immersed in an alkaline aqueous solution of pH 8.5 and a temperature of 80° C. for seven days. The peel strength survival rate is a ratio of a peel strength value of the jacket layer 80 with respect to the watertight layer 60 after the immersion of the power cable to an initial peel strength value of the jacket layer 80 with respect to the watertight layer 60 before the immersion of the power cable.

When the peel strength survival rate is less than 70%, close adhesion between the watertight layer 60 and the jacket layer 80 cannot be maintained under a harsh condition, e.g., when an external impact is applied to the power cable or when a temperature sharply changes.

For example, the adhesion assisting layer 65 may include, as base resin, acryl-based resin or olefin-based resin, and preferably, random copolymer resin of olefin and a polarity monomer. The adhesion assisting layer 65 may be formed using a general coating process, such as spraying, immersion, or extrusion.

The polarity monomer may include a vinyl ester monomer such as vinyl acetate or vinyl versatate; a vinyl-unsaturated carboxylic acid monomer such as methacrylic acid, acrylic acid, maleic acid, or itaconic acid; an acryl-based monomer such as (meth)acrylate or alkyl(meth)acrylate; or a combination thereof. The content of the polarity monomer may be 5 to 20 weight %, and preferably, 5 to 15 weight % with respect to a total weight of resin.

Preferably, base resin of an additive used to form the adhesion assisting layer 65 may be ethylene acrylic acid (EAA), ethylene vinyl acetate (EVA), ethylene butylacrylate (EBA), or the like.

The adhesive layer 70 adheres the watertight layer 60 and the jacket layer 80 to each other, and blocks moisture passing through the jacket layer 80 to suppress the peel strength of the adhesive layer 70 with respect to the watertight layer 60 from being reduced due to the moisture.

Here, the adhesive layer 70 may be formed of resin having a density of 0.93 or greater, e.g., a density of 0.93 to 0.97, and having a degree of crystallinity of greater than 50%, e.g., a degree of crystallinity of greater than 50% and equal or less than 90%. Thus, the adhesive layer 70 may have a melting point or 100° C. or higher, e.g., a melting point of 100 to 140° C.

The adhesive layer 70 has high density and a high degree of crystallinity, and has a high waterproofing property since an additive, such as carbon black, which forms a moisture moving path, is not added thereto, unlike the jacket layer 80. Thus, the adhesive layer 70 may suppress a decrease in the peel strength of the adhesive layer 70 with respect to the watertight layer 60 due to permeation of moisture.

The adhesive layer 70 may have a thickness of 1 to 5 mm, and preferably, 1 to 3 mm. Here, when the adhesive layer 70 has a thickness of less than 1 mm, it does not have a sufficient waterproof property. Thus, the peel strength of the adhesive layer 70 with respect to the watertight layer 60 may be reduced due to permeation of moisture. In contrast, when the adhesive layer 70 has a thickness of greater than 5 mm, a whole diameter of the power cable increases unnecessarily and the adhesive layer 70 is gradually cooled after being extruded. Thus, a form in which the plurality of neutral wires used to form the metal layer 50 protrude may appear on a surface of the jacket layer 80.

In order to closely adhere the watertight layer 60 and the jacket layer 80 to each other, the adhesive layer 70 may be formed of resin of the same group as resins used to form the watertight layer 60 and the jacket layer 80, e.g., an ethylene homopolymer or copolymer, and preferably, high-density polyethylene (HDPE) resin.

The jacket layer 80 may include polyethylene, polyvinyl chloride, polyurethane, or the like. The jacket layer 80 preferably includes resin of the same group as the resin used to form the adhesive layer 70, e.g., polyethylene resin, to maintain close adhesion strength between the adhesive layer 70 and the jacket layer 80. More preferably, since the jacket layer 80 is provided on an outermost surface of the power cable, the jacket layer 80 includes high-density polyethylene (HDPE) resin when the mechanical strength thereof is considered. Furthermore, the jacket layer 80 may include a small amount of an additive such as carbon black, e.g., 2 to 3 weight % of the additive, to achieve a desired color the power cable.

The jacket layer 80 preferably has, for example, a thickness of 5 to 8 mm so that it may be closely adhered to the adhesive layer 70 to absorb an external impact when the external impact is applied to the power cable.

As described above, a power cable according to the present invention includes the watertight layer 60 of which base layer is a copper tape which is lighter in weight than existing lead and has a higher corrosion resistance than that of existing aluminum, and is thus lightweight and has high corrosion resistance, when compared to existing power cables.

Furthermore, the power cable may achieve an effect of maintaining close adhesion of the layers thereof regardless of an externally physical impact and a temperature change by precisely controlling adhesion strength of the adhesion assisting layer 65 for forming the watertight layer 60, and a density, degree of crystallinity, and thickness of the adhesive layer 70 for adhering the watertight layer 60 and the jacket layer 80 to each other.

The power cable according to the present invention may further include a buffer layer (not shown) for protecting the watertight layer 60 from an external impact applied to the power cable and maintaining the adhesive strength between the watertight layer 60 and the adhesive layer 70 even when an external impact is applied to the power cable.

The buffer layer is provided between the watertight layer 60 과 the adhesive layer 70 to absorb an external impact applied to the power cable, thereby preventing damage to the watertight layer 60, and particularly, the copper tape, and suppressing interlayer peeling.

In particular, when a degree of an external impact applied to the power cable exceeds a degree of an impact that can be absorbed by the buffer layer, some of the impact may be delivered to the watertight layer 60, and particularly, the copper tape. Thus, a recessed part partially occurs in the copper tape. The recessed part may be a path through which moisture permeating from the outside moves in a lengthwise direction of the power cable. The buffer layer includes flexible resin compared to the adhesive layer 70 and may thus fill the recessed part to additionally suppress the movement of the moisture in the lengthwise direction of the power cable.

When an external impact is applied to an existing power cable having no buffer layer during installation of the power cable, the external impact may be delivered to a watertight layer and thus cause interlayer peeling to occur. In particular, when a recessed part occurs in the watertight layer, the recessed part may be a path through which moisture permeating from the outside moves in a lengthwise direction of the cable.

The buffer layer preferably includes resin having a melting point of 80° C. or higher, a density of 0.85 to 0.94, and having hardness (shore A) of 65 or greater to withstand heat generated during operating of the cable. When the resin used to form the buffer layer has a density of less than 0.85 and hardness (shore A) of less than 65, an external impact applied to the cable cannot be sufficiently absorbed. When the resin has a density of greater than 0.94, the recessed part which may occur in the copper tape due to an external impact applied to the cable cannot be sufficiently filled with the resin.

The buffer layer is provided on the watertight layer 60, and particularly, between the adhesion assisting layer 65 and the adhesive layer 70. Thus, in order to suppress interlayer peeling, the resin included in the buffer layer is preferably easily adherable to and mixable with the resin included in the adhesion assisting layer 65 and the resin included in the adhesive layer 70.

The resin included in the buffer layer may include, for example, an ethylene copolymer, and preferably, at least one ethylene copolymer selected from the group consisting of ethylene butyl acrylate (EBA), ethylene vinyl acetate (EVA), ethylene acrylic acid (EAA), etc., and may include a copolymer with α-olefin such as ethylene, 1-butene, 1-hexene, or 1-octane, or a rubber-based material.

The buffer layer may have a thickness of 1 to 3 mm. If it is assumed that the adhesive layer 70 has a thickness as will be described below, when the buffer layer has a thickness of less than 1 mm, the buffer layer may be insufficient to absorb an external impact applied to the cable and fill a recessed part occurring in the watertight layer 60 due to the external impact. In contrast, an external diameter of the cable may increase unnecessarily when the buffer layer has a thickness of greater than 3 mm.

The present invention is also directed to a method of manufacturing a power cable. The method of manufacturing a power cable according to the present invention may include forming an conductor layer 10, an inner semiconducting layer 20 covering the conductor layer 10, an insulating layer 30 covering the inner semiconducting layer 20, an outer semiconducting layer 40 covering the insulating layer 30, and a metal layer 50 covering the outer semiconducting layer 40; forming a watertight layer 60 by vertically adding a metal tape having an adhesion assisting layer 55 stacked on an upper surface thereof to an outer surface of the metal layer 50, and adhering overlapping parts of opposite ends of the watertight layer 60 on which the metal tape is vertically added; forming an adhesive layer 70 by extruding the adhesive layer 70 on an outer surface of the adhesion assisting layer 55 at an extrusion temperature which is higher than or equal to a melting point of the adhesion assisting layer 55; and forming a jacket layer 80 by extruding the jacket layer 80 on an outer surface of the adhesive layer 70 at an extrusion temperature which is higher than or equal to a melting point of the adhesive layer 70.

Before the forming of the watertight layer 60, the method of manufacturing a power cable according to the present invention may further include forming a first semiconducting layer using a first semiconducting tape to cover the outer semiconducting layer 40, and forming a second semiconducting layer using a second semiconducting tape to cover the metal layer 50.

Furthermore, in the forming of the watertight layer 60, the overlapping parts may be adhered to each other via a hot-melt adhesive having a creep resistance temperature of 80° C. or higher or a softening temperature. In the forming of the adhesive layer 70, the adhesive layer 70 may be formed by extruding resin having a density of 0.93 or greater and a degree of crystallinity of greater than 50%.

EXAMPLES

1. Preparation Examples

A sample sheet according to Example 1 was manufactured by sequentially stacking an adhesive layer (high-density polyethylene having a density of 0.956), a copper tape, an adhesion assisting layer (ethylene vinyl acetate), an adhesive layer (high-density polyethylene having a density of 0.956), and an external jacket (high-density polyethylene, carbon black 2.5 weight %) through a hot pressure work under conditions of press temperature 160° C. (ten minutes), cooling temperature 40° C. (ten minutes), and pressure of 4,800 kg/m². Furthermore, sample sheets according to examples and comparative examples were manufactured, in which litmus paper was inserted between two samples of adhesive layers shown in Table 1 below.

TABLE 1

|  | Resin | Thickness (mm) |
|---|---|---|
| Example 2 | Resin 1 | 1.0 |
| Example 3 | Resin 1 | 2.0 |
| Example 1 | Resin 1 | 0.25 |
| Example 2 | Resin 1 | 0.5 |
| Example 3 | Resin 2 | 0.25 |
| Example 4 | Resin 2 | 0.5 |
| Example 5 | Resin 2 | 1.0 |
| Example 6 | Resin 2 | 2.0 | resin 1: high-density polyethylene (density: 0.956)
resin 2: ethylene/acrylic acid random copolymer resin (density: 0.927)

2. Evaluation of physical properties
1) Evaluation of peel ptrength

In the sample sheet according to Example 1, the peel strength of an external jacket with respect to a copper tape was measured before and after the sample sheet was immersed in an alkaline aqueous solution of pH 8.5 and a temperature of 80° C. A result of measuring the peel strength is as shown in Table 2 below.

TABLE 2

|  | Before immersion | 7 days after immersion | 21 days after immersion | 42 days after immersion | 84 days after immersion |
|---|---|---|---|---|---|
| Peel strength (N/mm) | 0.86 | 0.80 | 0.77 | 0.78 | 0.77 |
| Peel strength survival rate (%) | 100 | 93 | 90 | 91 | 90 |

As shown in Table 2 above, a power cable according to Example 1 of the present invention showed that an adhesive layer had high waterproof property and high adhesiveness and thus a ratio of interlayer adhesion strength between a watertight layer and an external jacket after the immersion of the sample sheet to interlayer adhesion strength between the watertight layer and the external jacket before the immersion of the sample sheet was 70% or greater.

2) Evaluation of Moisture Penetration

Each of samples according to Examples 2 and 3 and Comparative examples 1 to 6 was immersed in an alkaline aqueous solution of pH 8.5 and a temperature of 80° C. and then a time period taken until the alkaline aqueous solution penetrated an adhesive layer of each of the samples and discolored litmus paper was measured. A result of the evaluation is as shown in Table 3 below.

TABLE 3

|  | Time period until permeation of moisture |
|---|---|
| Example 2 | 125 days or more |
| Example 3 | 125 days or more |
| Comparative example 1 | 7 days |
| Comparative example 2 | 48 days |
| Comparative example 3 | 0 days |
| Comparative example 4 | 3 days |
| Comparative example 5 | 12 days |
| Comparative example 6 | 19 days |

As shown in Table 3 above, it revealed that adhesive layers according to Examples 2 and 3 of the present invention included resin having a density of 0.93 or greater and had a thickness which was greater than or equal to a specific value and thus had a sufficient waterproof property.

In contrast, it revealed that adhesive layers according to Comparative examples 1 to 4 had a thickness of less than a threshold value and had an insufficient waterproof property, and that adhesive layers according to Comparative examples 5 and 6 included resin having a density of less than the threshold value and thus had an insufficient waterproof property.

Although exemplary embodiments of the present invention have been described herein, it would be apparent to those of ordinary skill in the art that the present invention may be embodied in many different forms without departing from the idea and scope of the invention as defined in the appended claims. Therefore, the scope of the invention should be defined by the appended claims, and all differences within the scope will be construed as being included in the present invention.

The invention claimed is:

1. A power cable comprising:
   a center conductor layer;
   an inner semiconducting layer provided on an outer surface of the center conductor layer;
   an insulating layer provided on an outer surface of the inner semiconducting layer;
   an outer semiconducting layer provided on an outer surface of the insulating layer;
   a metal layer provided on an outer surface of the outer semiconducting layer, the metal layer including a plurality of metal wires;
   a watertight layer provided on an outer surface of the metal layer;
   an adhesive layer having a density of 0.93 or greater and a degree of crystallinity of greater than 50%, the adhesive layer provided on an outer surface of the watertight layer; and
   a jacket layer provided on an outer surface of the adhesive layer.

2. The power cable of claim 1, further comprising:
   a first semiconducting layer provided between the outer semiconducting layer and the metal layer;
   a second semiconducting layer provided between the metal layer and the watertight layer; and
   an adhesion assisting layer provided between the watertight layer and the adhesive layer.

3. The power cable of claim 2, wherein the watertight layer has a thickness of 0.1 to 0.25 mm, and
   the adhesion assisting layer has a thickness of 0.05 to 0.09 mm.

4. The power cable of claim 2, wherein an additive used to form the adhesion assisting layer comprises either copolymer resin of olefin and a polarity monomer or blended resin.

5. The power cable of claim 4, wherein the polarity monomer comprises one of:
- a vinyl ester monomer, including vinyl acetate or vinyl versatate;
- a vinyl-unsaturated carboxylic acid monomer, including methacrylic acid, acrylic acid, maleic acid, or itaconic acid; and
- an acryl-based monomer, including (meth)acrylate or alkyl(meth)acrylate.

6. The power cable of claim 5, wherein a random copolymer resin of olefin and a polarity monomer comprises ethylene acrylic acid (EAA), ethylene vinyl acetate (EVA), or ethylene butyl acrylate (EBA).

7. The power cable of claim 6, wherein content of the polarity monomer is 5 to 20 weight % with respect to a total weight of the random copolymer resin.

8. The power cable of claim 1, wherein the watertight layer comprises a metal material of the same group as the metal layer.

9. The power cable of claim 8, wherein the watertight layer comprises copper (Cu).

10. The power cable of claim 1, wherein the watertight layer is formed by vertically adding a metal tape having the adhesion assisting layer stacked thereon, and overlapping opposite ends of the watertight layer to each other.

11. The power cable of claim 10, wherein the opposite ends of the watertight layer are adhered to each other in an overlapping region via a hot-melt adhesive.

12. The power cable of claim 11, wherein the hot-melt adhesive has a creep resistance temperature of 80° C. or higher and a softening temperature.

13. The power cable of claim 12, wherein the hot-melt adhesive comprises polyamide resin, polyethylenevinyl acetate resin, or both of them.

14. The power cable of claim 1, wherein the adhesive layer comprises high-density polyethylene (HDPE) resin.

15. The power cable of claim 1, wherein the adhesive layer does not include an additive capable of forming a moisture moving path.

16. The power cable of claim 1, wherein the adhesive layer has a thickness of 1 to 5 mm.

17. The power cable of claim 16, wherein the adhesive layer has a thickness of 1 to 3 mm.

18. The power cable of claim 1, wherein the jacket layer comprises high-density polyethylene (HDPE) resin and has a thickness of 5 to 7.5 mm.

19. The power cable of claim 1, further comprising a buffer layer configured to absorb an external impact applied to the power cable, the buffer layer being provided between the watertight layer and the adhesive layer.

20. A power cable comprising:
- a center conductor layer;
- an inner semiconducting layer provided on an outer surface of the center conductor layer;
- an insulating layer provided on an outer surface of the inner semiconducting layer;
- an outer semiconducting layer provided on an outer surface of the insulating layer;
- a metal layer provided on an outer surface of the outer semiconducting layer, the metal layer including a plurality of metal wires;
- a watertight layer provided on an outer surface of the metal layer;
- an adhesive layer provided on an outer surface of the watertight layer;
- a jacket layer provided on an outer surface of the adhesive layer;
- a first semiconducting layer provided between the outer semiconducting layer and the metal layer;
- a second semiconducting layer provided between the metal layer and the watertight layer; and
- an adhesion assisting layer provided between the watertight layer and the adhesive layer, wherein the adhesion assisting layer comprises an additive having adhesiveness to make a peel strength survival rate of the jacket layer with respect to the watertight layer be 70% or greater, when measured after immersing the power cable in an alkaline aqueous solution of pH 8.5 and a temperature of 80° C. for seven days.

21. A method of manufacturing a power cable including a conductor layer, an inner semiconducting layer covering the conductor layer, an insulating layer covering the inner semiconducting layer, an outer semiconducting layer covering the insulating layer, and a metal layer covering the outer semiconducting layer, the method comprising:
- forming a watertight layer by vertically adding a metal tape having an adhesion assisting layer stacked thereon on an outer surface of the metal layer, and adhering overlapping parts of opposite ends of the metal tape to each other;
- forming an adhesive layer by extruding resin having a density of 0.93 or greater and a degree of crystallinity of greater than 50% on an outer surface of the adhesion assisting layer at an extrusion temperature which is higher than or equal to a melting point of the adhesion assisting layer; and
- forming a jacket layer on an outer surface of the adhesive layer by extruding the jacket layer at an extrusion temperature which is higher than or equal to a melting point of the adhesive layer.

22. The method of claim 21, before the forming of the watertight layer, further comprising forming a first semiconducting layer using a first semiconducting tape to cover the outer semiconducting layer.

23. The method of claim 21, before the forming of the watertight layer, further comprising forming a second semiconducting layer using a second semiconducting tape to cover the metal layer.

24. The method of claim 21, wherein the forming of the watertight layer comprises adhering the overlapping parts to each other via a hot-melt adhesive at a creep resistance temperature of 80° C. or higher or a softening temperature.

* * * * *